(12) United States Patent
Huang et al.

(10) Patent No.: US 7,324,707 B2
(45) Date of Patent: Jan. 29, 2008

(54) INTERPOLATION METHOD FOR GENERATING PIXEL COLOR

(75) Inventors: Hsu-Lien Huang, Hsinchu (TW); Chung-Ping Chen, Hsinchu (TW)

(73) Assignee: Altek Corporation, Hsinchu (TW)

( * ) Notice: Subject to any disclaimer, the term of this patent is extended or adjusted under 35 U.S.C. 154(b) by 647 days.

(21) Appl. No.: 10/960,962

(22) Filed: Oct. 12, 2004

(65) Prior Publication Data
US 2006/0078229 A1    Apr. 13, 2006

(51) Int. Cl.
G06K 9/32    (2006.01)
G06K 9/00    (2006.01)

(52) U.S. Cl. .................................... 382/300
(58) Field of Classification Search ............... 382/162, 382/164, 165, 167, 254, 276, 300; 358/515, 358/518, 523, 525
See application file for complete search history.

(56) References Cited

U.S. PATENT DOCUMENTS 6,181,376 B1 * 1/2001 Rashkovskiy et al. ...... 348/273
6,836,289 B2 * 12/2004 Koshiba et al. ............. 348/273
6,917,381 B2 * 7/2005 Acharya et al. ............. 348/252
2006/0078229 A1 * 4/2006 Huang et al. ............... 382/300

* cited by examiner

Primary Examiner—Amir Alavi
(74) Attorney, Agent, or Firm—Rosenberg, Klein & Lee (57) ABSTRACT

An interpolation method for generating pixel color is used for color generating of an array composed of red, green, and blue pixels so that each pixel has red, green, and blue components. After signals of the pixel array are received, the signal trends in the horizontal and vertical directions around pixels are first determined. Next, two pixels adjacent to each pixel are calculated along the direction of minimum variation to complement data of the pixel location using this calculated value. Subsequently, the lost blue or/and red component of each pixel is generated for pixels in the horizontal and vertical directions so that each pixel has red, green, and blue components. Accurate color interpolation can thus be provided to accomplish the effect of high and stable resolution.

14 Claims, 11 Drawing Sheets

| G | R | G | R₇ | G | R |
|---|---|---|----|---|---|
| BG' | G | BG' | G₆ | BG' | G |
| G | R₁ | G₂ | R₅G₅ | G₈ | R₉ |
| BG' | G | BG' | G₄ | BG' | G |
| G | R | G | R₃ | G | R |
| BG' | G | BG' | G | BG' | G |
| G | R | G | R | G | R |

Figs. 4B

| G | R | G | R | G | R |
|---|---|---|---|---|---|
| BG' | G | BG' | G | BG' | G |
| G | RG' | G | RG' | G | RG' |
| BG' | G | BG' | G | BG' | G |
| G | RG' | G | RG' | G | RG' |
| BG' | G | BG' | G | BG' | G |
| G | RG' | G | RG' | G | RG' |

| GB' | R₁G₁'B' | BG' | R₂G₂'B' | GB' | RG'B' |
|---|---|---|---|---|---|
| BG' | GR'B' | G₀B'R₀ | GR'B' | BG' | GR'B' |
| GB' | RG'B' | BG' | RG'B' | GB' | RG'B' |
| BG' | GR'B' | BG' | GR'B' | BG' | GR'B' |
| GB' | RG'B' | GB' | RG'B' | GB' | RG'B' |
| BG' | GR'B' | BG' | GR'B' | BG' | GR'B' |
| GB' | RG'B' | GB' | RG'B' | GB' | RG'B' |

Figs. 6D

| GB'R' | RG'B' | GB'R' | RG'B' | GB'R' | RG'B' |
|---|---|---|---|---|---|
| BG'R' | GR'B' | BG'R' | GR'B' | BG'R' | GR'B' |
| GB'R' | RG'B' | GB'R' | RG'B' | GB'R' | RG'B' |
| BG'R' | GR'B' | BG'R' | GR'B' | BG'R' | GR'B' |
| GB'R' | RG'B' | GB'R' | RG'B' | GB'R' | RG'B' |
| BG'R' | GR'B' | BG'R' | GR'B' | BG'R' | GR'B' |
| GB'R' | RG'B' | GB'R' | RG'B' | GB'R' | RG'B' |

$R_C = 25$
$R_5 = 200$
$R_6 = 21$
$R_7 = 23$
$R_8 = 203$ $G_1 = 230$
$G_2 = 20$
$G_3 = 24$
$G_4 = 233$

| G | B | G | B | G | B | G | B | G |
|---|---|---|---|---|---|---|---|---|
| B | G | R | G | B | $R_7$ | G | R | G |
| G | B | G | B | $G_3$ | B | G | B | |
| B | G | $R_5$ | $G_1$ | $R_C G_C$ | $G_4$ | $R_8$ | G | |
| G | B | G | B | $G_2$ | B | G | B | |
| B | R | G | $R_6$ | G | R | G | | |

Fig. 7

INTERPOLATION METHOD FOR GENERATING PIXEL COLOR

FIELD OF THE INVENTION

The present invention relates to the field of electronic image, more particularly, to the generation of color image.

BACKGROUND OF THE INVENTION

Image sensor arrays are widely used in digital photography for detecting image signals. The minimum unit for framing an object (scene) in each image sensor is called a pixel. In other words, each pixel location is a photo-sensing unit.

Figure 1:
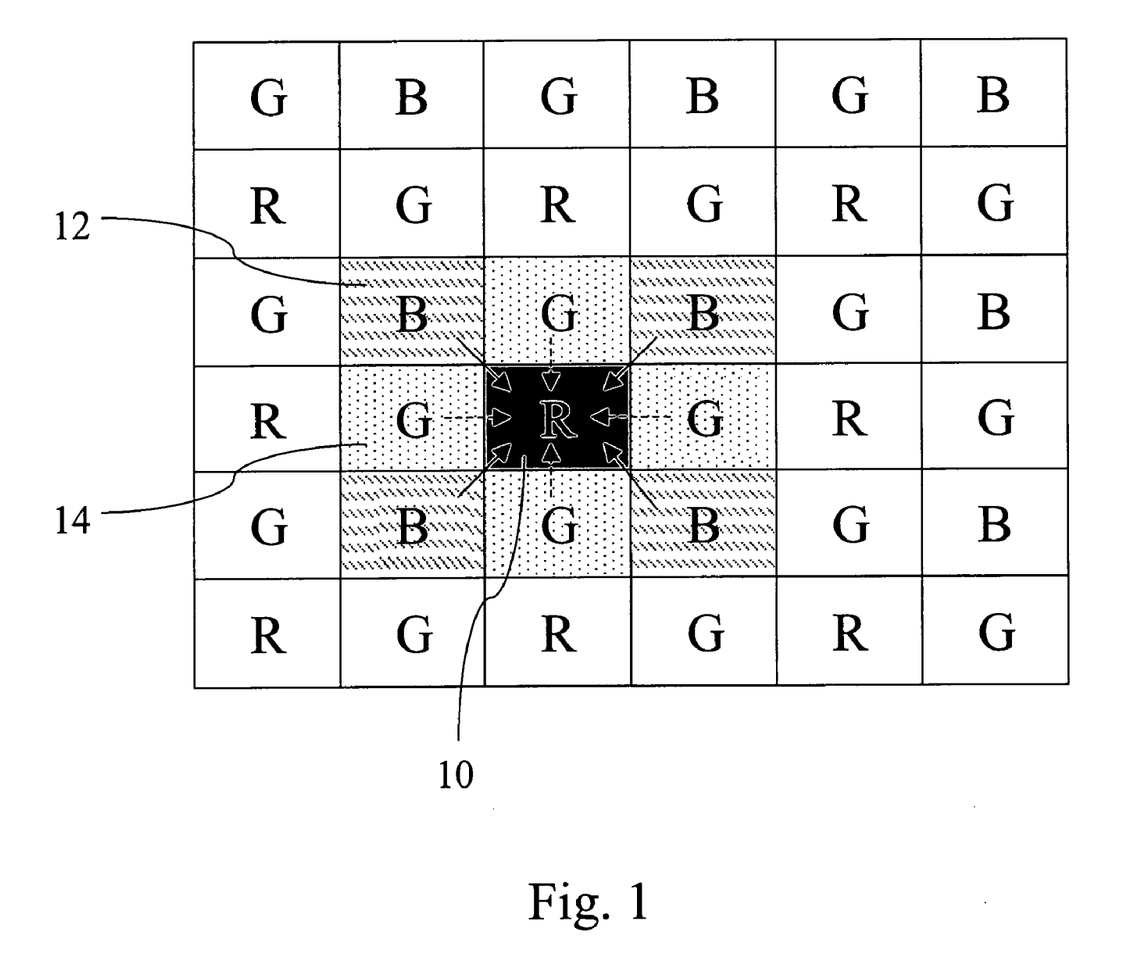
FIG. 1 is a diagram showing how colors are generated in an image pixel array in the prior art.

The pixel itself responds to light intensity only but has no discrimination capability to light color. Therefore, a simple image sensor array can only take a gray level image. In general, a color filter array (CFA) of a regular pattern, for example, of red, green and blue color (the three primary colors: R, G, and B) filter, overlies the image sensor so that the sensor can detect the color image at different pixel locations. However, the image sensor overlies by such CFA only detects one color at each pixel location and, accordingly, can not capture original information corresponding to all the three primary colors for each pixel location. As shown in FIG. 1, a typical arrangement of the color filter array of the image sensor is that the green pixels are arranged horizontally and vertically in a checkerboard pattern, and the red and blue pixels are each horizontally and vertically adjacent to a green pixel. Another common arrangement is of CYGM (cyan-yellow-green-magenta) type.

Because this kind of image sensor captures one color component for each pixel location, after using an image processor to receive image pixel brightness data of an image sensor array, an interpolation method is usually exploited to construct lost color components of each pixel location to obtain three full color image planes for each object (scene). In conventional color interpolation methods, other pixels beside each primary color pixel are made use of for calculating out data of the other two primary colors. For example, as shown in FIG. 1, there are four blue pixels 12 and four green pixels 14 around each red pixel 10. The pixel interpolation system will utilize the color value of the nearest four blue pixels 12 and the four green pixels 14 for interpolating the lost blue and green colors for the central red pixel 10, thereby obtaining a complete RGB color information for the of the red pixel location 10. The interpolation principle for the blue and green pixels 12 and 14 is the same. When capturing some images having detailed color lines or delicate color variation, however, if one of the four averaged pixels is located at the edge of the image or the signal has a larger variation, the average value will be affected by this pixel and thus prone to color edge artifacts in the image, thus affecting the whole image quality.

In order to improve the above problem, R.O.C. Pat. No. 413797 discloses an edge interpolation method for color rebuilding, wherein interpolation is carried out in the horizontal, vertical, or diagonal (45 degrees) direction of the central pixel. In the above disclosure, however, only the trend of the brightness value of green colors is used to determine the direction. There still exists possibility of erroneous determination of the direction to cause inaccurate result, hence being not able to provide a stable resolution.

Accordingly, the present invention aims to propose an interpolation method to reduce artifacts caused by detailed color lines and delicate color variation to improve the image quality.

SUMMARY OF THE INVENTION

An aspect of the present invention is to provide an interpolation method for generating pixel color, wherein the determination of signal edge and trend is added in before interpolation. Moreover, the determination also takes the color value difference of surrounding green and blue/red pixel into account, and color values in the accurate direction are used for rebuilding in the whole interpolation process. Accurate color interpolation can thus be accomplished to improve the drawback of large errors in the prior art.

Another aspect of the present invention is to provide an interpolation method for generating pixel color to accomplish high and stable image resolution for displaying natural and smooth output images.

To achieve the above aspects, an interpolation method for generating pixel color of the present invention is used to generate lost color components of green, red, and blue pixels of an image pixel array. First, the signal trends in the horizontal and vertical directions around interest pixels are determined after receiving signals of the image pixel array. Next, two pixels adjacent to the interested pixel are calculated along the direction of minimum variation. This calculated value is used as lost component data for the interested pixel location. Subsequently, the lost blue or/and red component of each pixel is generated for pixels in the horizontal and vertical directions so that each pixel has red, green, and blue components.

The various aspects and advantages of the present invention will be more readily understood from the following detailed description when read in conjunction with the appended drawing, in which:

DETAILED DESCRIPTION OF THE PREFERRED EMBODIMENTS

Before performing interpolation of the present invention, the determination of signal edge and trend is carried out for four green pixels around the red/blue pixel to be generated. Moreover, signal trend of red and blue pixels around a green pixel is also taken into account in the determination to use two green pixels in the horizontal or vertical direction having a smaller signal variation for averaging, hence providing interpolation values of green component for red/blue pixels. The green component is then based on for carrying out interpolation of lost red and/or blue components of other pixels.

Figure 2:
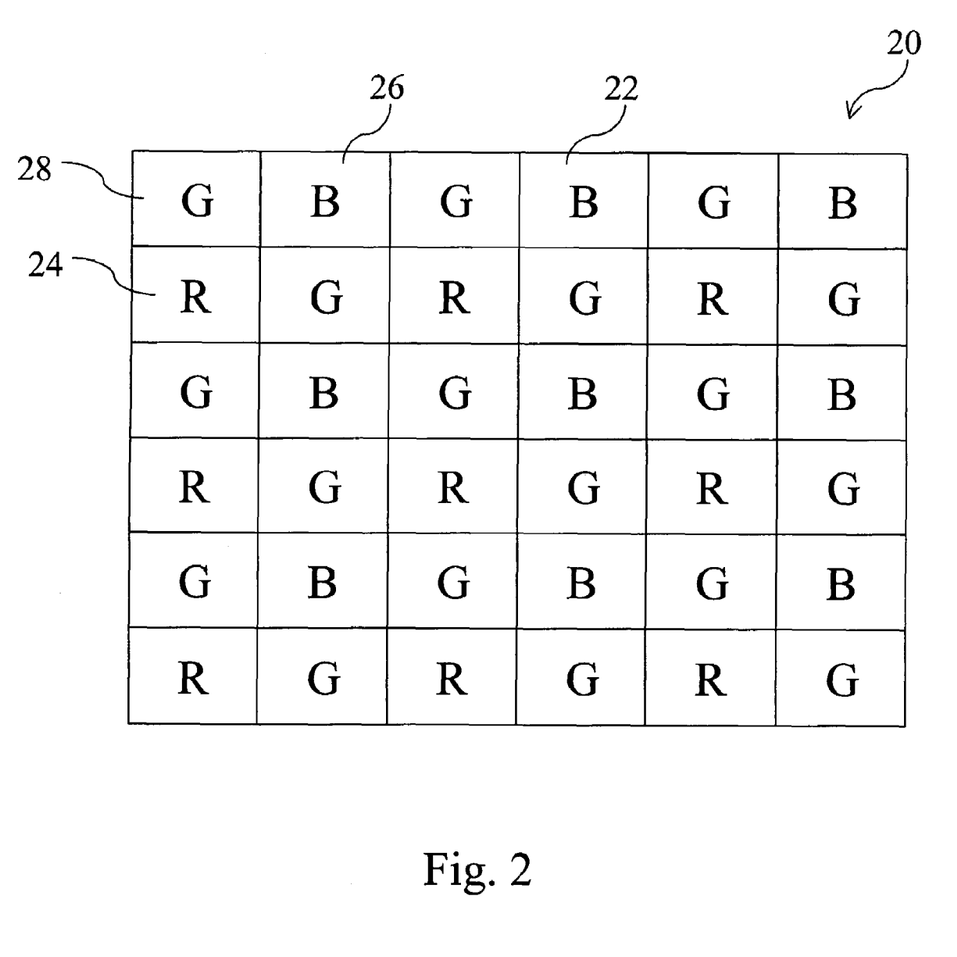
FIG. 2 is an image pixel array of the present invention.

As shown in FIG. 2, an image pixel array 20 generated after light passing a color filter array is composed of a plurality of pixels 22. The plurality of pixels 22 comprises red pixels 24, blue pixels 26 and green pixels 28. The image pixel array 20 is formed by arranging in order a green-blue pixel row and a red-green pixel row. Each red pixel 24 or blue pixel 26 of the image pixel array 20 has four green pixels 28 around. Because each primary color pixel 22 has only a single color component, it is necessary to generate lost color components of each pixel 22 so that each pixel 22 has red, green, and blue components.

Among the three primary colors (red, green and blue), the green color has the highest luminance and can provide accurate brightness data. In the interpolation method of the present invention, green pixels 28 are first based on to determine signal trend for averaging two alternate green pixels. This average value is then used as the brightness value of the lost green component of the red pixels 24 or the blue pixels 26.

The interpolation method for generating pixel color of the present invention is a kind of software, usually realized with an image processor. Please refer to FIG. 3 as well as FIG. 2. First, signals of an image pixel array 20 from an image sensor array are received, and the image pixel array 20 is then scanned in order from left to right. Each time a blue pixel 26 or a red pixel 24 is scanned, the four green pixels 28 around are based on to determine signal trends in the horizontal and vertical directions around these four green pixels 28 (Step S10). In the determination of signal trends, the values of the green pixels 28 and the red/blue pixels 24/26 around each of these four green pixels 28 are based on. Next, two green pixels 28 adjacent to each red/blue pixel 24/26 are averaged along the direction having the smallest variation (Step S12). This average value is used as the green component in each red/blue pixel 24/26. The above steps S10 and S12 are repeated for orderly scanning and rebuilding of the lost green component in each red/blue pixel 24/26 until the green components in all the red/blue pixels 24/26 are rebuilt. The image pixel array 20 can also be scanned in order from top to bottom.

Figure 3:
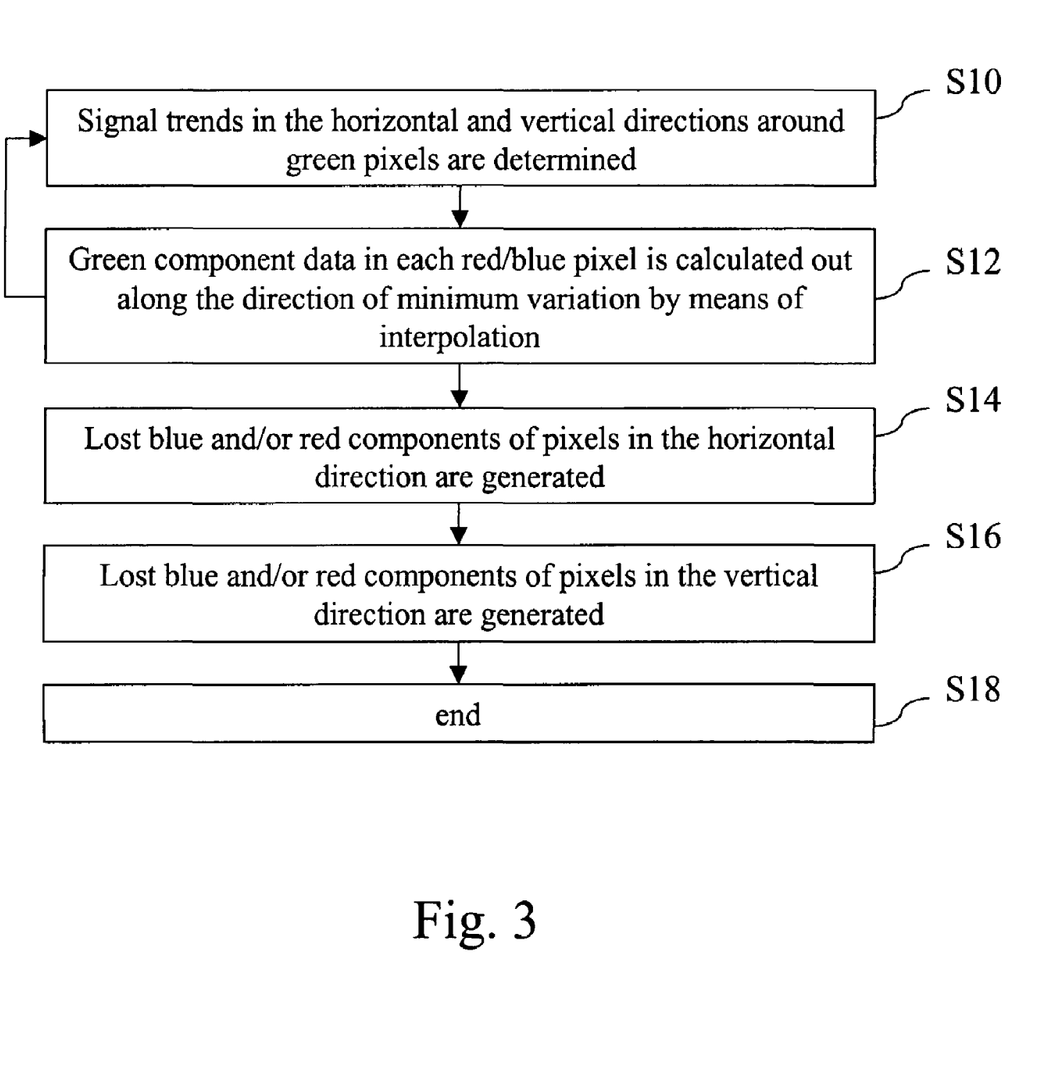
FIG. 3 is a flowchart of an interpolation method for generating pixel color of the present invention.

In the above steps S10 to S12, when the signal variation of the pixels 22 around the green pixel 28 in the horizontal direction is smaller than that in the vertical direction, the horizontal direction is based on to calculate two green pixels 28 adjacent to each red/blue pixel 24/26 along the horizontal direction. This calculated value is used as the green component in each red/blue pixel 24/26 for generating the green component. When the signal variation of the pixels 22 around the green pixel 28 in the vertical direction is smaller than that in the horizontal direction, the vertical direction is based on to calculate two green pixels 28 adjacent to each red/blue pixel 24/26 along the vertical direction for generating the green component in each red/blue pixel 24/26.

After the steps S10 and S12 of rebuilding the lost green components of the pixels 22, the lost blue components and/or red components of the pixels 22 are generated by means of interpolation for generating the lost blue and red components of each green pixel 28, generating the lost red component of each blue pixel 26, and generating the lost blue component of each red pixel 24. First, lost blue components and/or red components of the pixels 22 along the horizontal direction of the image pixel array 20 are generated by means of interpolation (Step S14). Next, lost blue components and/or red components of the pixels 22 along the vertical direction of the image pixel array 20 are generated by means of interpolation (Step S16). Rebuilding of red components and blue components of the pixels 22 is thus completed. Each pixel 22 will have green, blue and red components. After rebuilding of pixel color, the interpolation process is finished (Step S18).

In the above interpolation method for generating pixel color, after rebuilding of green components, rebuilding of blue and red components is carried out first along the horizontal direction and then along the vertical direction. The rebuilding order of blue and red components and the rebuilding order along the horizontal and vertical directions can be changed. That is, rebuilding of blue and red components can be carried out first along the vertical direction and then along the horizontal direction.

Figure 4A:
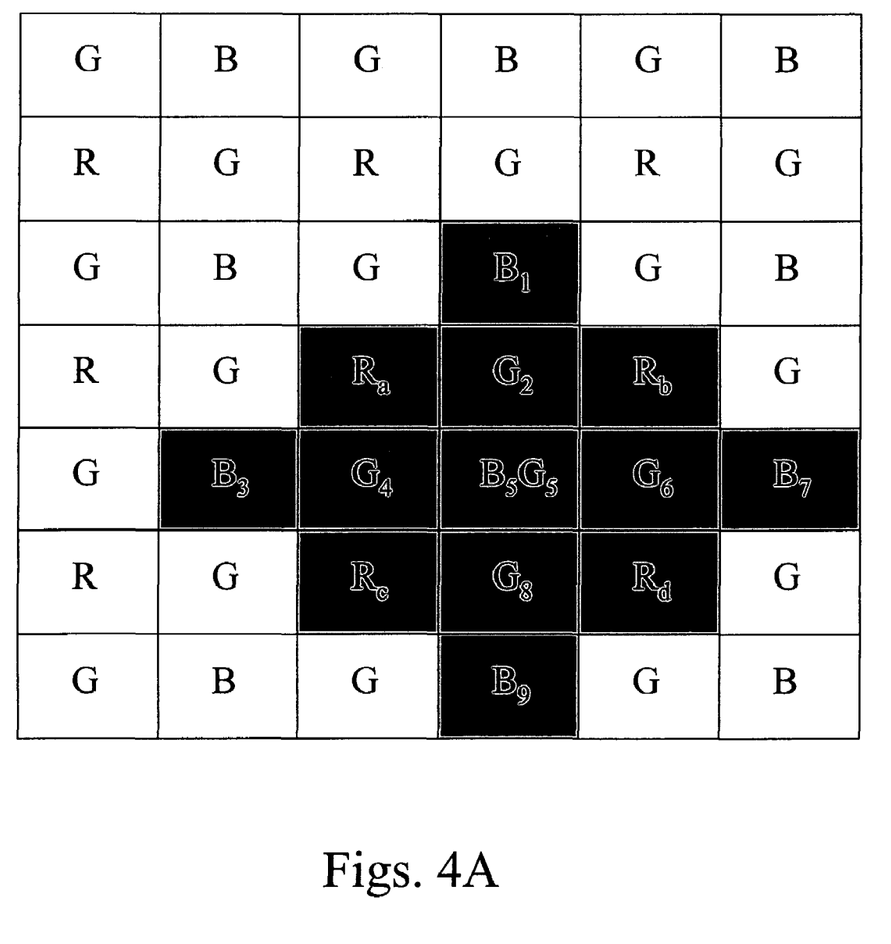
FIGS. 4A to 4C show the image pixel array in each step of rebuilding green components of the present invention.

The interpolation method for generating pixel color of the present invention is practically applied for color rebuilding in an image processing system, as shown in FIGS. 4A to 4C, FIGS. 5A to 5D, and FIGS. 6A to 6D. First, as shown in FIG. 4A, an image passes a color filter array (CFA) and an image sensor array to form an image pixel array. Before subsequent processing of the image, it is necessary to rebuild the lost color components. The present invention first performs calculation for the green (G) color. The green-blue-green-blue (GBGB) row is first processed. In FIG. 4A, $G_5$ originally doesn't exist. It is necessary to refer to the brightness values of the four green pixels $G_2$, $G_4$, $G_6$ and $G_8$ around $B_5$ for rebuilding of $G_5$ at the position $B_5$ and make a certain determination. The determination rule is as follows.

$$G_5=(G_4+G_6)\div2; \text{ if } \Delta H<\Delta V$$

$$G_5=(G_2+G_8)\div2; \text{ if } \Delta H>\Delta V$$

where $\Delta H=|G_4-G_6|+|B_5-B_3+B_5-B_7|$ represents the signal variation in the horizontal direction, and $\Delta V=|G_2-G_8|+|B_5-B_1+B_5-B_9|$ represents the signal variation in the vertical direction. The lost $G_5$ at the position $B_5$ can thus be generated.

Figure 4B:
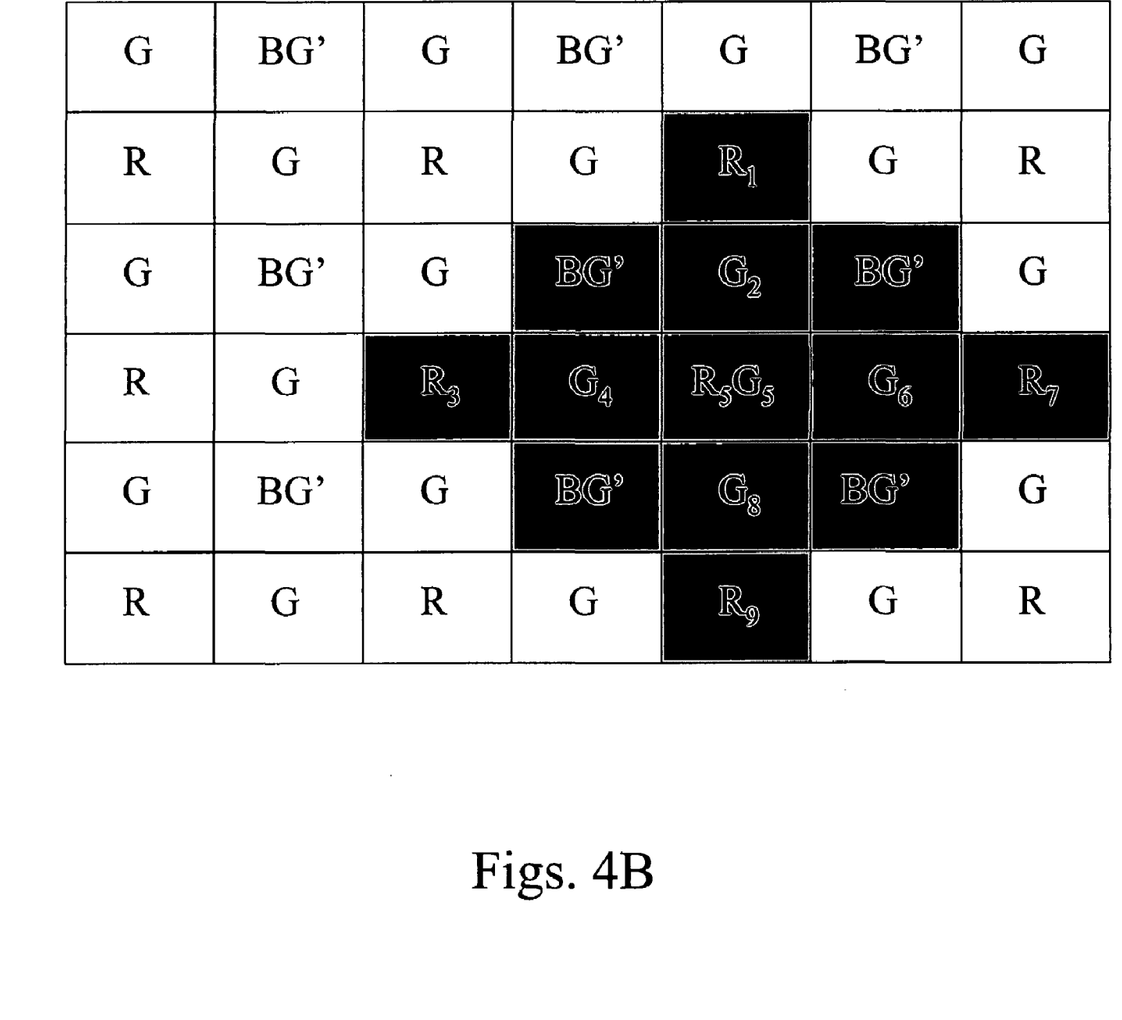

The lost G' values at positions B in the GBGB row are thus calculated out in order by means of interpolation to change FIG. 4A to FIG. 4B, wherein each position B in the GBGB row has a green component G'.

After rebuilding of green components in the GBGB row, the green-red-green-red (GRGR) row is then processed. As shown in FIG. 4B, G5 originally doesn't exist. It is necessary to refer to the brightness values of the four green pixels $G_2$, $G_4$, $G_6$, and $G_8$ around $R_5$ for rebuilding of $G_5$ at the position $R_5$ and make a certain determination. The determination rule is as follows.

$$G_5=(G_4+G_6)\div2; \text{ if } \Delta H<\Delta V$$

$$G_5=(G_2+G_8)\div2; \text{ if } \Delta H>\Delta V$$

where $\Delta H=|G_4-G_6|+|R_5-R_3+R_5-R_7|$ represents the signal variation in the horizontal direction, and $\Delta V=|G_2-G_8|+|R_5-R_1+R_5-R_9|$ represents the signal variation in the vertical direction. The lost $G_5$ at the position $R_5$ can thus be generated.

Figure 4C:
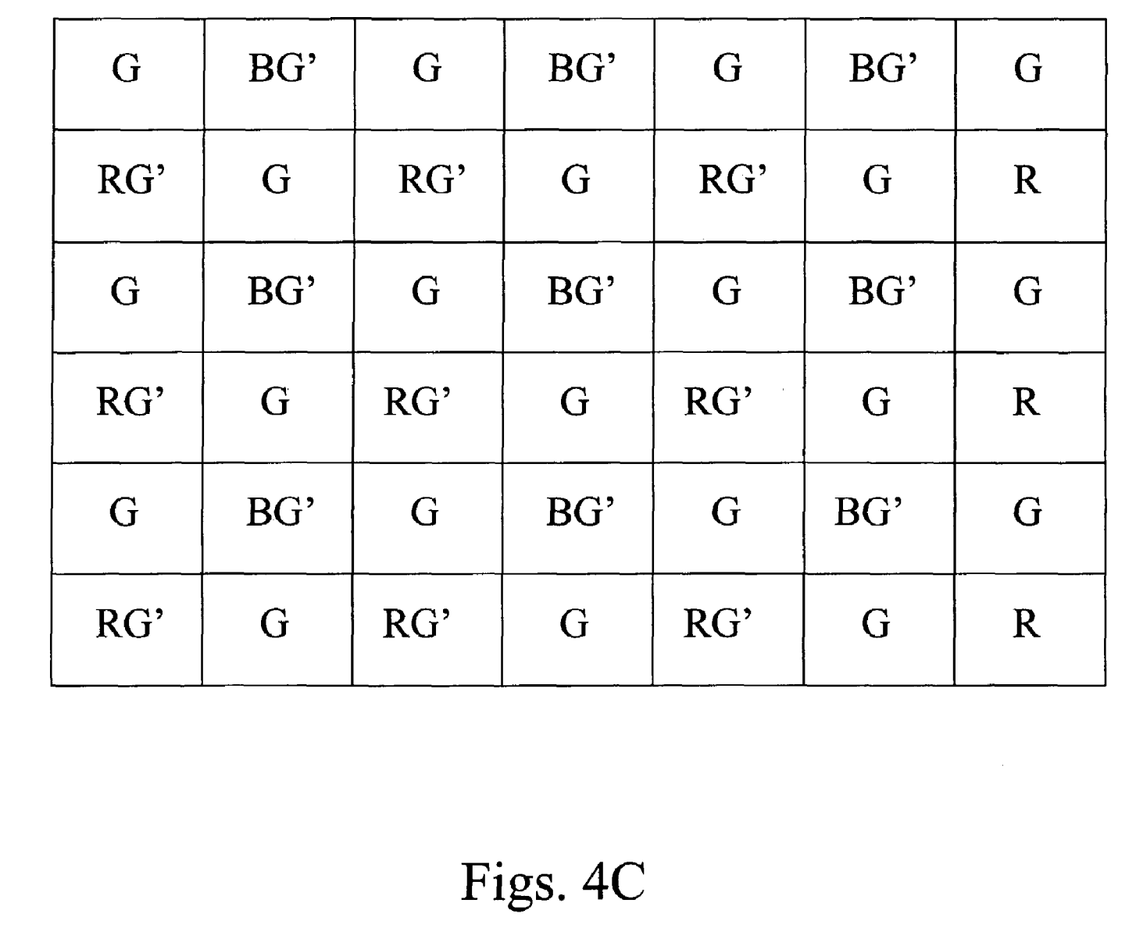

The lost G' values at positions R in the GRGR row are thus calculated out in order by means of interpolation to change FIG. 4B to FIG. 4C, wherein each position R in the GRGR row has a green component G'. Heretofore, rebuilding of green components of all pixels in the image pixel array is completed.

Figure 5A:
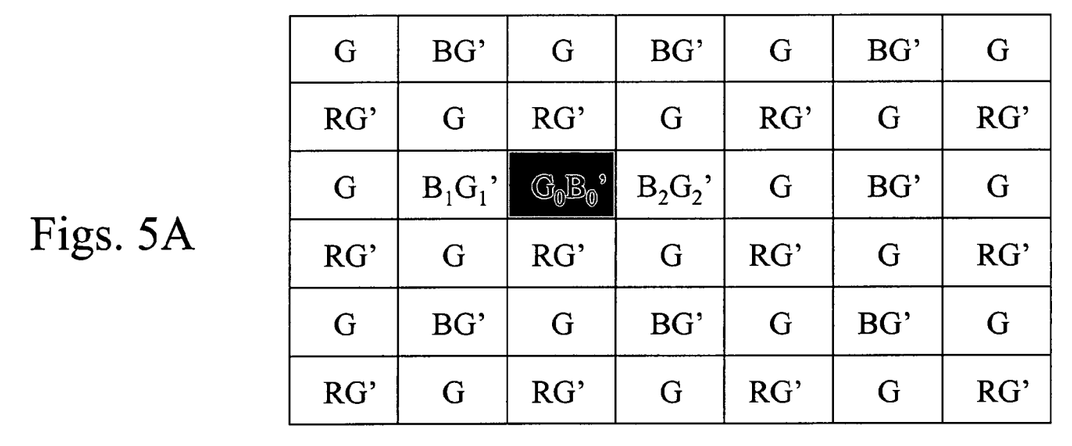
FIGS. 5A to 5D show the image pixel in each step of rebuilding blue and red components in the horizontal direction of the present invention.

After rebuilding of the green (G) color, the lost blue components B' in the horizontal GBGB row are then calculated out with reference to the blue pixel values (B) along the horizontal direction. As shown in FIG. 5A, $B_0'$ originally doesn't exist. It is necessary to refer to the difference values of $B_1$ and $G_1'$ and $B_2$ and $G_2'$ beside $G_0$ in the horizontal direction and $G_0$ for rebuilding of $B_0'$ at the position $G_0$. The equation is as follows.

$$B_0'=[(B_1-G_1')+(B_2-G_2')]\div 2+G_0 \quad (1)$$

Figure 5B:
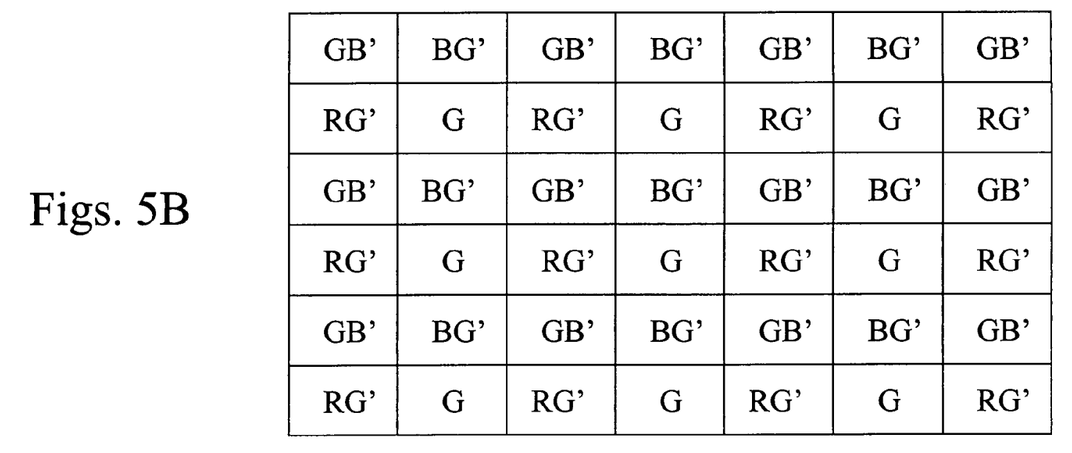

The lost blue components B' of the G pixels in the horizontal GBGB row can thus be calculated out one by one to change FIG. 5A to FIG. 5B, wherein each G position in the GBGB row has a blue component B'.

Figure 5C:
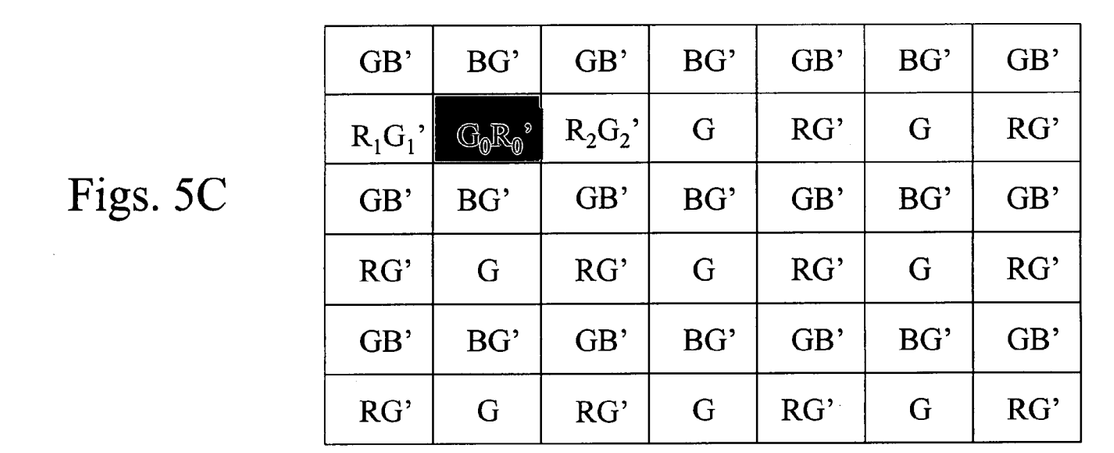

In FIG. 5C, the lost red components R' in the horizontal GRGR row are then calculated out with reference to the R values along the horizontal direction. As shown in FIG. 5C, $R_0'$ originally doesn't exist. It is necessary to refer to the difference values of $R_1$ and $G_1'$ and $R_2$ and $G_2'$ beside $G_0$ in the horizontal direction and $G_0$ for rebuilding of $R_0'$ at the position $G_0$. The equation is as follows.

$$R_0'=[(R_1-G_1')+(R_2-G_2')]\div 2+G_0 \quad (2)$$

Figure 5D:
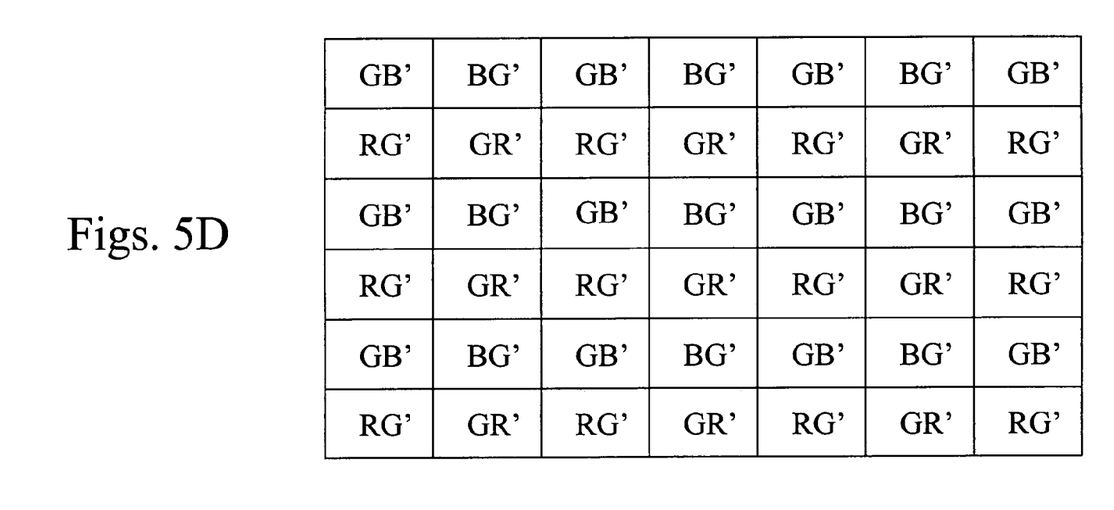

The lost red components R' of the G pixels in the horizontal GRGR row can thus be calculated out one by one to change FIG. 5C to FIG. 5D, wherein each G position in the GRGR row has a red component R'. Heretofore, rebuilding of blue (B) and red (R) components in the horizontal direction of all pixels in the image pixel array is completed.

Figure 6A:
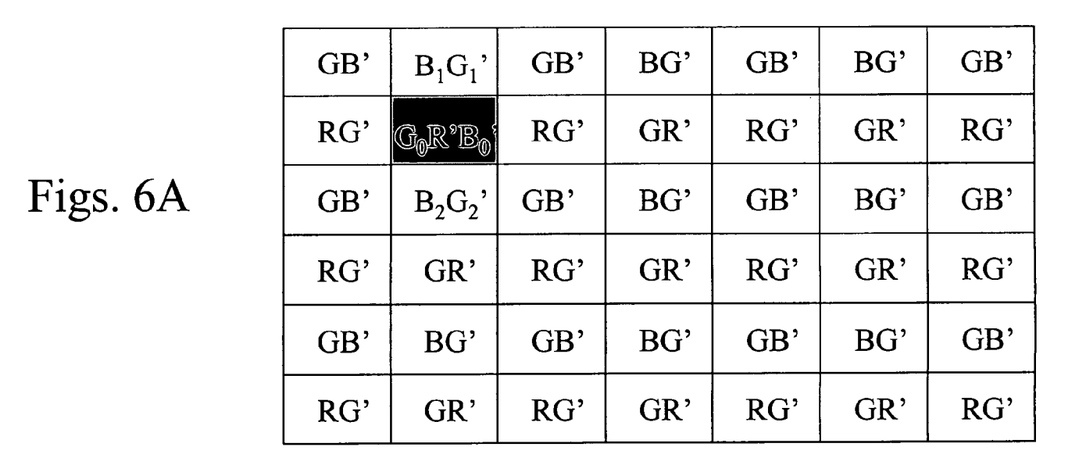
FIGS. 6A to 6D show the image pixel in each step of rebuilding blue and red components in the vertical direction of the present invention.

After rebuilding of the blue (B) and red (R) colors in the horizontal direction, the lost blue and red components in the vertical direction are rebuilt using the same method and principle as in the horizontal direction. Lost B' values of pixels having GR' or RG' in the vertical direction are calculated out with reference to the B values along the vertical direction. As shown in FIG. 6A, $B_0'$ originally doesn't exist. It is necessary to refer to the difference values of $B_1$ and $G_1'$ and $B_2$ and $G_2'$ beside $G_0$ in the vertical direction and $G_0$ for rebuilding of $B_0'$ at the position $G_0$. The equation is as follows.

$$B_0'=[(B_1-G_1')+(B_2-G_2')]\div 2+G_0 \quad (1)$$

Figure 6B:
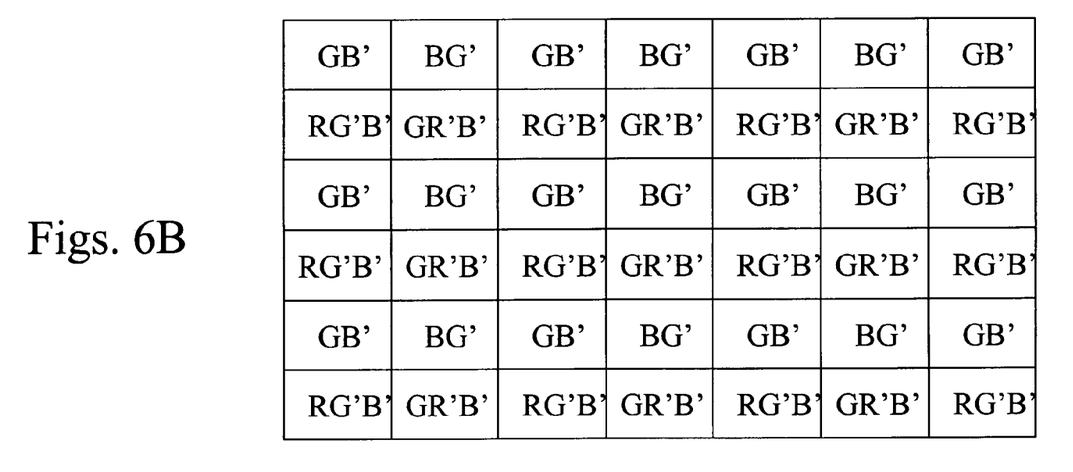

The lost blue components B' of the pixels having GR' or RG' in the vertical can thus be calculated out one by one to change FIG. 6A to FIG. 6B, wherein each pixel of each column has a blue component.

Figure 6C:
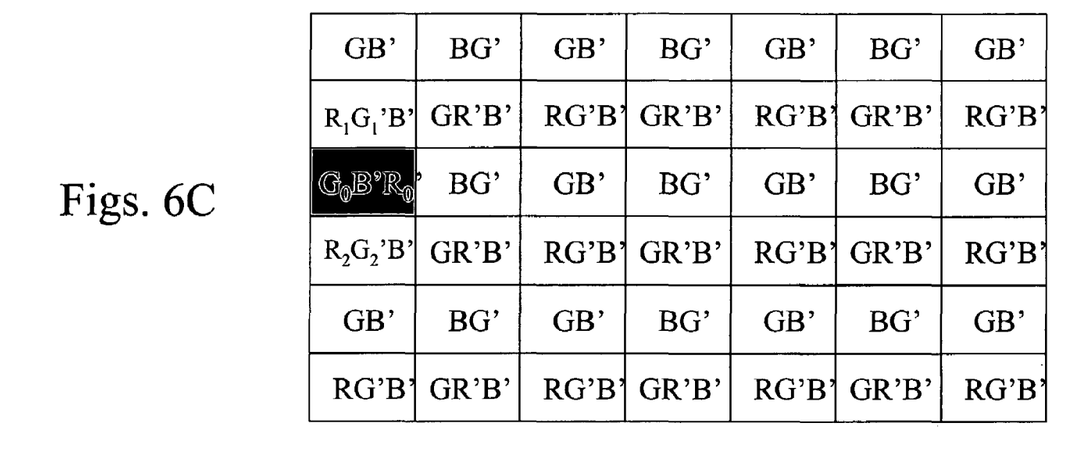

In FIG. 6C, the lost red components R' of the pixels having BG' or GB' in the vertical direction are calculated out with reference to the R values along the vertical direction. As shown in FIG. 6C, $R_0'$ originally doesn't exist. It is necessary to refer to the difference values of $R_1$ and $G_1'$ and $R_2$ and $G_2'$ beside $G_0$ in the vertical direction and $G_0$ for rebuilding of $R_0'$ at the position $G_0$. The equation is as follows.

$$R_0'=[(R_1-G_1')+(R_2-G_2')]\div 2+G_0 \quad (2)$$

Figure 6D:
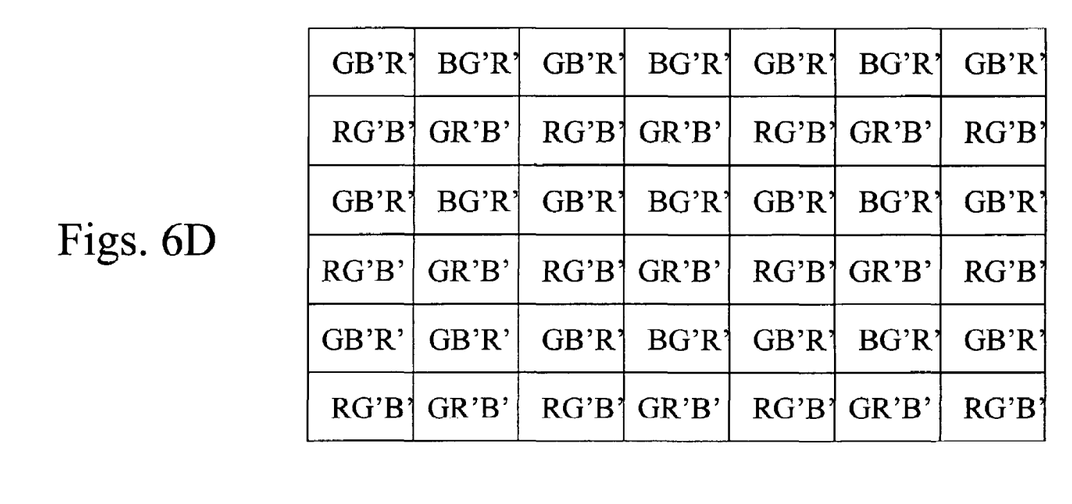

The lost red components R' of the pixels in the vertical direction can thus be calculated out one by one to change FIG. 6C to FIG. 6D, wherein each pixel has red (R), green (G), and blue (B) components. Heretofore, rebuilding of the whole image is completed.

Figure 7:
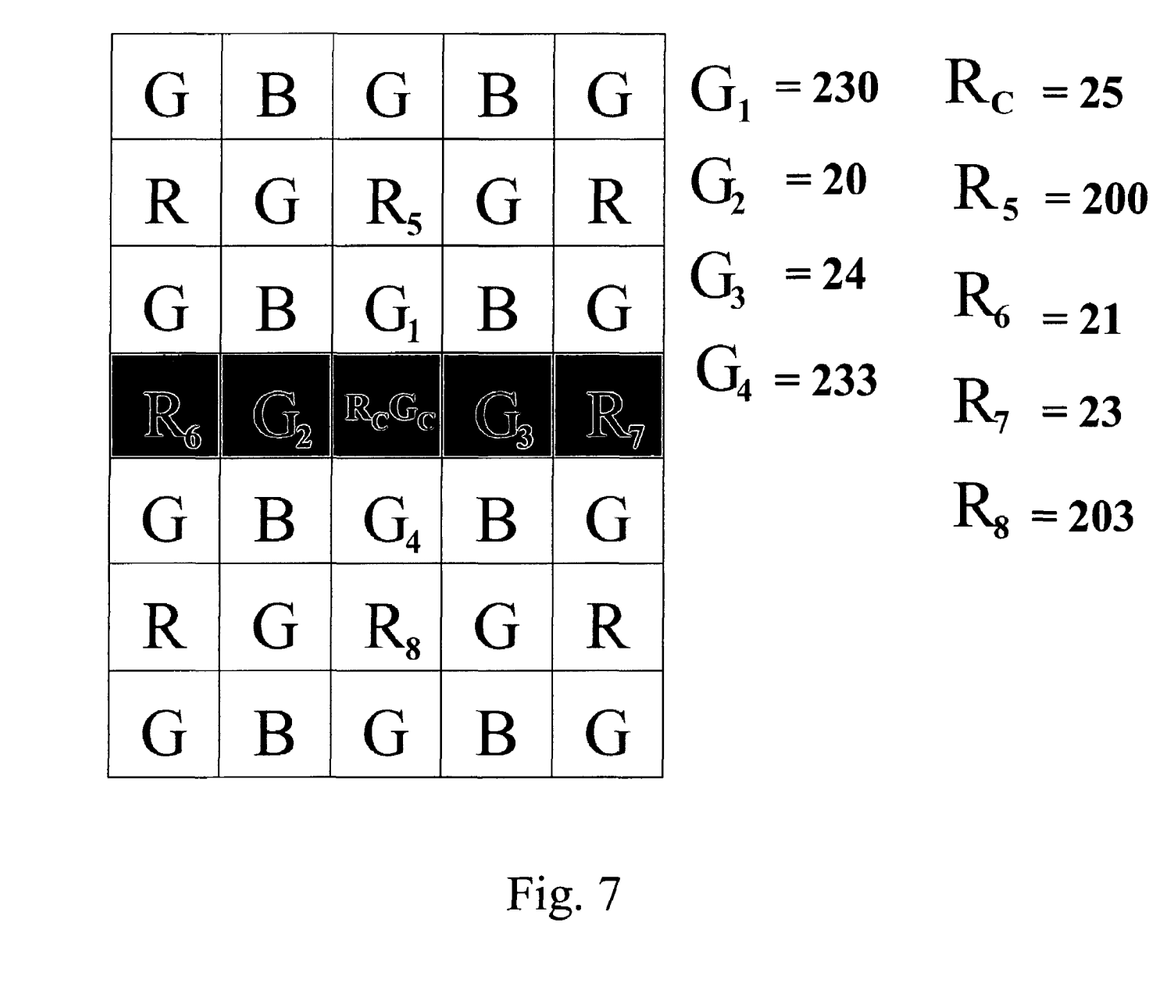
FIG. 7 is a diagram showing a simulated image pixel array and luminosities of pixels of the present invention.

The difference between the interpolation methods of the present invention and the prior art will be exemplified with an embodiment below to prove the function and effect of the present invention. As shown in FIG. 7, it is simulated that a straight line close to the black color (represented by a deep color) passes a region close to the white color (represented by a light color). If the conventional color interpolation method is adopted, only the variation of G values is used to determine signal trends in the vertical and horizontal directions to get the interpolation value $G_C$. The determination process is as follows.

vertical variation of G: $(G_1-G_4)=|233-230|=3$;
horizontal variation of G: $(G_2-G_3)=|24-20|=4$;
∴ horizontal variation>vertical variation.

If only the variation of G value is used for determination as in the prior art, erroneous judgment that the signal variation in the vertical direction is smaller will arise due to insufficient data so that the system will use $(G_1+G_4)/2$ for calculation of the $G_c$ value at the center. The G values will become discontinuous (20, 231, 24) so that the line will appear broken.

Contrarily, if the color interpolation method of the present invention is exploited, the following is first used to calculate signal variations of the G values in the vertical and horizontal directions:

vertical variation of G: $(G_1-G_4)=|233-230|=3$;
horizontal variation of G: $(G_2-G_3)=|24-20|=4$;

Next, R values are used to assist in determination:
vertical variation of R: $(2R_C-R_5-R_8)=|50-200-203|=353$;
horizontal variation of R: $(2R_C-R_6-R_7)=|50-21-23|=6$;
∴ (vertical variation of G+vertical variation of R)>
(horizontal variation of G+horizontal variation of R)

Therefore, after R values are used to assist in determination, the actual trend can be known to get the information that the signal variation in the horizontal direction is smaller. The system will then use $(G_2+G_3)/2$ for calculation of the $G_C$ value at the center for getting a more accurate interpolation value. The G values will become 20, 22, and 24 so that this line won't appear broken but appear continuous and clear.

To sum up, before carrying out interpolation of the present invention, G values are taken into account as well as the directionality of surrounding B and R values to add in determination of signal edge and trend. Two green pixels along the horizontal or vertical direction having a smaller signal variation are averaged to get a more accurate G value. Subsequently, the B and R values are calculated out based on the G values by means of interpolation to provide accurate color interpolation values, hence accomplishing the effect of high and stable resolution. The image will appear natural and smooth to exactly improve the drawback of large errors in the conventional color interpolation system.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. An interpolation method for generating pixel color used in an image pixel array generated after light passing a color filter, said image pixel array being composed of red, green, and blue pixels, said interpolation method being used to complement lost color components of each said pixel so that each said pixel has red, green, and blue components, said interpolation method comprising the steps of:

determining the signal trends in the horizontal and vertical directions around pixels;

calculating two said pixels adjacent to each pixel along the direction of minimum variation and using the calculated value as lost component data in each said pixel location; and generating a lost blue or/and red component of each said pixel by means of interpolation for said pixels in the horizontal and vertical directions so that each said pixel has green, red, and blue components.

2. The interpolation method for generating pixel color as claimed in claim 1, wherein said pixel array is formed by arranging in order a green-blue pixel row and a red-green pixel row.

3. The interpolation method for generating pixel color as claimed in claim 1, wherein values of green pixels and red/blue pixels around each said green pixel in the horizontal and vertical directions are used for determination in said step of determining the signal trends in the horizontal and vertical directions around pixels.

4. The interpolation method for generating pixel color as claimed in claim 1, wherein if the variation of signal values of pixels around said green pixel in the horizontal direction is smaller than that in the vertical direction, two said green pixels at two sides of each red/blue pixel in the horizontal direction are averaged with the horizontal direction as the basis, and the average is used as green component data in each said red/blue pixel.

5. The interpolation method for generating pixel color as claimed in claim 1, wherein if the variation of signal values of pixels around said green pixel in the vertical direction is smaller than that in the horizontal direction, two said green pixels at two sides of each red/blue pixel in the vertical direction are averaged with the vertical direction as the basis, and the average is used as green component data in each said red/blue pixel.

6. The interpolation method for generating pixel color as claimed in claim 1, wherein color components of said pixels in the horizontal direction are first generated and color components of said pixels in the vertical direction are then generated in said step of generating a lost blue or/and red component of each said pixel by means of interpolation for said pixels in the horizontal and vertical directions.

7. The interpolation method for generating pixel color as claimed in claim 1, wherein color components of said pixels in the vertical direction are first generated and color components of said pixels in the horizontal direction are then generated in said step of generating a lost blue or/and red component of each said pixel by means of interpolation for said pixels in the horizontal and vertical directions.

8. The interpolation method for generating pixel color as claimed in claim 1, wherein lost blue and red components of each said green pixel are generated, a lost red component of each said blue pixel is generated, and a lost blue component of each said red pixel is generated in said step of generating a lost blue or/and red component of each said pixel by means of interpolation for said pixels in the horizontal and vertical directions.

9. An interpolation method for generating pixel color used in an image pixel array generated after light passing a color filter, said image pixel array comprising first, second, and third pixels, said interpolation method being used to complement lost color components of each said pixel so that each said pixel has first, second, and third components, said interpolation method comprising the steps of:
determining the signal trends in the horizontal and vertical directions around pixels;
calculating two said pixels adjacent to each pixel along the direction of minimum variation and using the calculated value as lost component data in each said pixel location; and
generating a lost second or/and third component of each said pixel by means of interpolation for said pixels in the horizontal and vertical directions so that each said pixel has first, second, and third components.

10. The interpolation method for generating pixel color as claimed in claim 9, wherein said first, second and third pixels are green, red and blue pixels, respectively, and said pixel array is formed by arranging in order a green-blue pixel row and a red-green pixel row.

11. The interpolation method for generating pixel color as claimed in claim 9, wherein values of first pixels and second/third pixels around each said first pixel in the horizontal and vertical directions are used for determination in said step of determining the signal trends in the horizontal and vertical directions around pixels.

12. The interpolation method for generating pixel color as claimed in claim 9, wherein color components of said pixels in the horizontal direction are first generated and color components of said pixels in the vertical direction are then generated in said step of generating a lost second or/and third component of each said pixel by means of interpolation for said pixels in the horizontal and vertical directions.

13. The interpolation method for generating pixel color as claimed in claim 9, wherein color components of said pixels in the vertical direction are first generated and color components of said pixels in the horizontal direction are then generated in said step of generating a lost second or/and third component of each said pixel by means of interpolation for said pixels in the horizontal and vertical directions.

14. The interpolation method for generating pixel color as claimed in claim 9, wherein lost second and third components of each said first pixel are generated, a lost third component of each said second pixel is generated, and a lost second component of each said third pixel is generated in said step of generating a lost second or/and third component of each said pixel by means of interpolation for said pixels in the horizontal and vertical directions.

* * * * *